Aug. 29, 1950      A. J. DOHM      2,520,459
LOCKING APPARATUS
Filed Dec. 26, 1944
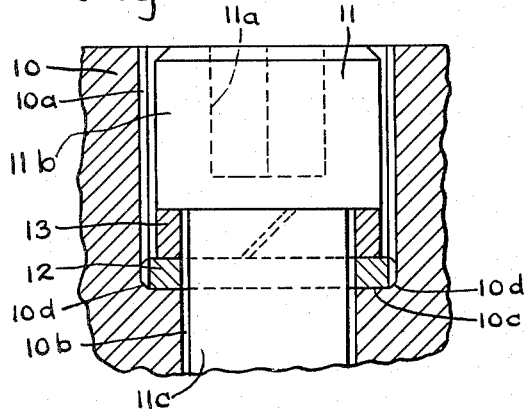
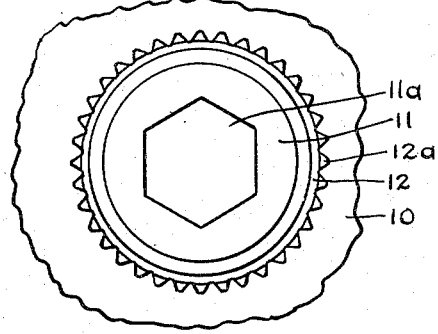
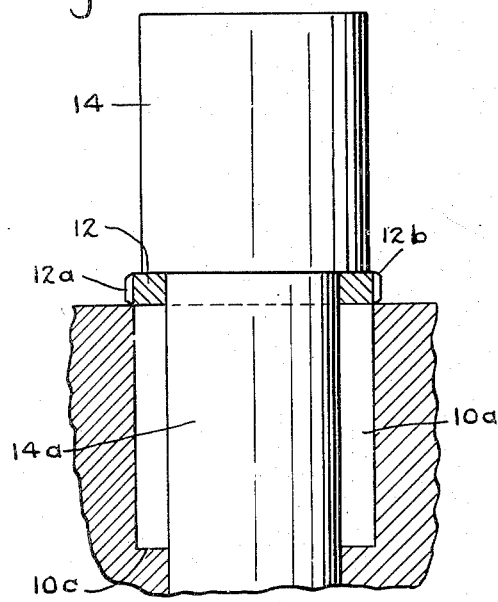
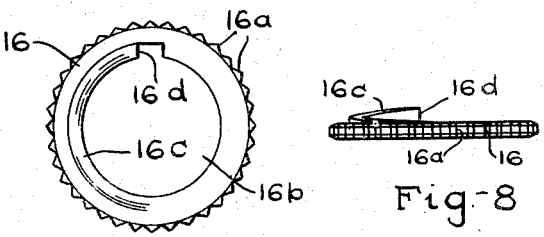
Inventor:
ARTHUR J. DOHM.
By Chas. C. Reif
Attorney.

Patented Aug. 29, 1950

2,520,459

UNITED STATES PATENT OFFICE 2,520,459

LOCKING APPARATUS

Arthur J. Dohm, St. Paul, Minn., assignor, by mesne assignments, to The Northern Pump Company, Minneapolis, Minn., a corporation of Minnesota Application December 26, 1944, Serial No. 569,879

2 Claims. (Cl. 151—32)

This invention relates to a locking device and particularly to a locking device for locking a rotatable member in relation to a member which is made of comparatively soft metal.

Locking members such as split helical washers are now commonly used and placed in engagement with one member and adapted to engage another member which is rotatable relatively to said first mentioned member. When the first mentioned member is made of comparatively soft metal, such as aluminum, many locking members, such as a split helical washer, will mar or tear up a portion of the member of comparatively soft metal. As a result, many specifications prohibit the use of certain locking members such as a split helical washer in contact with a member of comparatively soft metal.

It is an object of this invention to provide a simple method and structure in which a locking member, such as a split helical washer, can be used in a body of comparatively soft metal without injuring the latter.

It is a further object of the invention to provide a method and structure in which a member of hard metal is provided, the same having peripheral projections, which member of hard metal is forced into the member made of comparatively soft metal so that relative rotation of the two is prevented. A locking member is then placed in engagement with the member made of hard metal, which locking member can also engage the member which it is desired to hold against rotation.

It is more specifically an object of the invention to provide a locking structure comprising a member made of comparatively soft metal and having a bore therein, which bore has an end extending transversely to the axis thereof, a member such as a washer of hard metal having peripheral projections, which latter member is forced into said bore, said projections engaging said first mentioned member and preventing rotation of said member of hard material, a locking member such as a split helical washer, in engagement with said member of hard material, the same being also in engagement with a member extending into said bore to prevent rotation of said last mentioned member.

It is still further an object of this invention to provide a locking member having peripheral means for engaging a body of comparatively soft material cooperating with facial locking means either on said member or a separate member.

These and other objects and advantages of the invention will be fully set forth in the following description made in connection with the accompanying drawings in which like reference characters refer to similar parts throughout the several views and in which:

Fig. 1 is a view in central vertical section of a structure of the invention;

Fig. 2 is a top plan view of the structure shown in Fig. 1;

Fig. 3 is a plan or face view of a locking member or washer used;

Fig. 4 is a vertical section taken on line 4—4 of Fig. 3 as indicated by the arrows;

Fig. 5 is a plan or face view of a portion of the member shown in Figs. 3 and 4 and shown on an enlarged scale;

Fig. 6 is a view in vertical section illustrating the method and operation of the invention;

Fig. 7 is a plan or face view of a locking member used;

Fig. 8 is a side or edge view of the locking member shown in Fig. 7; and

Fig. 9 is a vertical section through an assembly using the member shown in Fig. 7.

Referring to the drawings a member 10 is shown which will be made of one of the softer metals such as aluminum. Said member is provided with a bore or recess 10a, which in the embodiment of the invention illustrated is shown as cylindrical. A rotatable member 11 such as a bolt or stud is disposed in bore or recess 10a and in the embodiment of the invention illustrated is shown as extending through a smaller bore 10b in member 10. Member 11 is provided with a socket 11a in its enlarged head portion 11b adapted to receive a tool for turning the same. Said socket is polygonal in transverse cross section and in the embodiment of the invention illustrated is shown as hexagonal. A member 12 is provided, illustrated as in the form of a washer, and the same is provided with peripheral projections 12a, which in the embodiment of the invention illustrated are shown as comparatively sharp teeth, which extend continuously about the periphery of member 12. Member 12 will be made of hard metal such as hard steel. In the use of the structure member 12 is forced into the bore 10a and one face thereof engages the bottom 10c of bore 10a, which bottom extends transversely of the axis of said bore and in the embodiment of the invention illustrated is shown as extending at right angles to said axis. The diameter of member 12 from the point of one tooth to the point of a tooth diametrically opposite is larger than the diameter of the bore 10a. When member 12 is forced into bore 10a the projections or teeth 12a cut into the sides of the bore and engage the body 10 so that when said member 12 is disposed in the bore 10a it is held from rotation therein.

While various ways and means could be used to force member 12 into place, one simple and convenient means which has been found very efficient in practice is illustrated in Fig. 6. A member or mandrel 14 is provided having a diameter slightly less than the diameter of bore 10a. Member 14 has a reduced portion 14a substantially fitting in the smaller bore 10b. A shoulder is thus formed on member 14 and the portion 14a is inserted through the bore in member 12, the diameter of which bore is the same as the diameter of the smaller bore 10b. The top of member 12 is engaged by the shoulder on member 14 and member 14 is then pushed downwardly in the bore 10a and smaller bore 10b and washer 12 is forced downwardly in the bore 10a. Member 14 is guided in the smaller bore 10b and member 12 is firmly held on member 14 so that member 12 can be easily and quickly seated against the bottom 10c of bore 10a. The diameter of member 12 within the teeth 12a is substantially the same as the diameter of bore 10a. Member 12 is bevelled or chamfered as shown at 12b at its top and bottom corner. This bevel is placed on member 12 to form an annular space 10d at the bottom thereof in which any metal from member 10 or metal pieces or chips therefrom can be located. A locking member 13 is placed on top of member 12, which locking member will have means adapted to engage member 12 and will also have means adapted to engage member 11. While various locking members might be used, in the embodiment of the invention illustrated member 13 is in the form of a split helical washer and is disposed between member 12 and the bottom of head 11b of member 11. Members 12 and 13 thus surround the body or shank 11c of member 11.

When a locking washer such as the washer 13 is used for preventing rotation it moves or rotates somewhat and the edge of the washer at the split portion tends to dig into the member which it engages. If the member is of soft material this will objectionably mar or injure the member. With the present construction member 13 does not engage the member 10 of soft material but instead engages the hard steel member 12. Member 12 is held from rotation and member 13 thus acts to prevent rotation of member 11 by engagement therewith. A very simple and very effective construction is thus provided for preventing rotation of member 11 relatively to member 10. The sharp edge of the locking washer 13 at its split portion cannot seriously damage the member 12 which is made of hard metal. The full effect of the locking washer 13 is thus obtained just as if the body 10 were made of hard metal. The terminal edges at the split portion of the washer 13 which extend transversely thereof, form a facial locking means engaging members 10 and 11 respectively.

In Figs. 7, 8 and 9 a modified structure is shown in which a member 16 is used. Member 16 is in the form of a washer and has the teeth or serrations 16a about its periphery. Member 16 has a bore or opening 16b adjacent one side of which it has a portion 16c extending around said bore and partially severed to form a helical strip. The end 16d of said strip is thus offset some distance from one face of member 16. Portion 16c is somewhat resilient.

When member 16 is used it will be forced into the bore 10a of the body 10 of softer material and will be seated against the bottom 10c thereof just as is the member 12. Member 16 will be held from rotation by engagement of the teeth 16a with the body 10. As is the case with member 12, member 16 has a diameter at the base of the teeth 16a substantially the same as the diameter of the bore 10a. The portion 16c will project upwardly from member 16 so that when the member 11 is placed in the bore 10a it will engage the portion 16c so that member 16 forms a locking washer preventing rotation of member 11 relative to body 10. The shoulder on member 11 will be engaged by the end 16d of the portion 16c. The member 16 thus takes the place of both members 12 and 13 shown in Figs. 1 to 5. Member 16 has both a peripheral locking means and a facial locking means. Member 16 could of course be made of varying thickness and, if desired, could be bevelled at its periphery as is the member 12. The structure shown in Fig. 9 is thus more compact and necessitates the use of fewer parts.

From the above description it will be seen that I have provided a very simple and efficient method and structure for preventing the rotation of a member relatively to a body made of comparatively soft metal or material. The structure is very compact and takes up an exceedingly small additional space over the customary structure. The method can be easily and quickly performed and the structure thus quickly assembled. The structure and method have been amply demonstrated in actual practice and found to be very successful and efficient.

It will of course, be understood that various changes may be made in the form, details, arrangement and proportions of the apparatus and in the steps and sequence of steps of the method without departing from the scope of applicant's invention, which generally stated, consists in a method and apparatus capable of carrying out the objects above set forth, such as disclosed and defined in the appended claims.

What is claimed is:

1. A device for preventing marring having in combination, a body of comparatively soft metal with a bore therein, said bore having an end extending transversely of the axis thereof, a metallic member disposed axially in said bore and adapted to be rotated, said member having a surface extending transversely of the axis thereof, a second comparatively thin annular member disposed in said bore and having a flat bottom surface engaging said end, said second member having a flat top surface and having means engaging the cylindrical wall of said bore to prevent rotation of said second member, a locking member above said second member having means engaging said second member to prevent rotation of said locking member and having means also engaging said surface of said first mentioned member to prevent rotation of the latter, said first mentioned member extending through said second member and locking member, whereby said first mentioned member is held from rotation and the bottom of said bore is not marred.

2. A device for preventing marring having in combination, a body of comparatively soft metal having a bore therein having a counterbore at one end thereof, said counterbore having an end surface extending transversely of the axis of said bore, a cylindrical member adapted to be rotated disposed axially in said bore and having a shoulder thereon the surface of which extends at right angles to the axis of said member and bore, a second comparatively thin annular member disposed in said counterbore and having a flat bottom surface engaging said end surface of said counterbore, said second member having a top surface and having peripheral means engaging the cylindrical wall of said counterbore to prevent rotation of said second member, and an annular locking member above said second member having locking means engaging the top surface and said shoulder, said first mentioned member extending through said second member and locking member whereby said first mentioned member is prevented from rotation and said end of said counterbore is not marred.

ARTHUR J. DOHM.

REFERENCES CITED

The following references are of record in the file of this patent:

UNITED STATES PATENTS

| Number | Name | Date |
|---|---|---|
| Re. 13,425 | Blossom | June 11, 1925 |
| 591,892 | Smith | Oct. 19, 1897 |
| 858,714 | Gaines | July 2, 1907 |
| 975,012 | Armstrong | Nov. 8, 1910 |
| 1,049,489 | Hughes | Jan. 7, 1915 |
| 1,427,807 | Halbleib | Sept. 5, 1922 |
| 1,616,996 | Talaga | Feb. 8, 1927 |
| 1,882,089 | Olson | Oct. 11, 1932 |
| 2,371,927 | Schmidt et al. | Mar. 20, 1945 |
| 2,400,318 | Rosan | May 14, 1946 |